United States Patent
Fasullo et al.

[19]

[11] Patent Number: 6,163,266
[45] Date of Patent: *Dec. 19, 2000

[54] FAN OPERATION DETECTION CIRCUIT FOR A DC FAN AND METHOD OF OPERATION THEREOF

[75] Inventors: Greg H. Fasullo, Dallas; Jin He, Plano; Greg P. Jorgenson, Quinlan; Victor K. Lee, Plano, all of Tex.

[73] Assignee: Lucent Technologies Inc., Murray Hill, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 09/207,450

[22] Filed: Dec. 8, 1998

[51] Int. Cl.$^7$ .................................................... G08B 21/00

[52] U.S. Cl. .......................... 340/664; 340/661; 340/662; 340/663; 340/648; 340/635; 364/565

[58] Field of Search ..................................... 340/664, 661, 340/662, 663, 635, 648, 611; 307/10.1; 364/565; 417/44.11

[56] References Cited

U.S. PATENT DOCUMENTS

| | | | |
|---|---|---|---|
| 3,885,200 | 5/1975 | Burkle | 317/40 R |
| 4,479,115 | 10/1984 | Holzhauer | 340/611 |
| 4,513,233 | 4/1985 | Giammarrusco | 318/565 |
| 4,912,576 | 3/1990 | Janz | 360/77.07 |
| 4,977,375 | 12/1990 | Toth | 324/511 |
| 5,424,584 | 6/1995 | Matsuda et al. | 307/10.1 |
| 5,436,827 | 7/1995 | Gunn et al. | 364/187 |
| 5,534,854 | 7/1996 | Bradbury et al. | 340/648 |
| 5,727,928 | 3/1998 | Brown | 417/44.11 |
| 5,790,430 | 8/1998 | Steiert | 364/565 |
| 5,889,469 | 3/1999 | Mykytiuk et al. | 340/635 |

*Primary Examiner*—Jeffery A. Hofsass
*Assistant Examiner*—Tai T. Nguyen

[57] ABSTRACT

For use with a DC fan, a detection circuit and a method of detecting an operational condition thereof. In one embodiment, the detection circuit includes: (1) a sensor, coupled to the DC fan, that senses a current through the sensorless DC fan and produces an intermediate signal based thereon and (2) an alarm circuit, coupled to the sensor, that compares the intermediate signal to a range defined by an upper limit signal and a lower limit signal and generates an alarm signal when the intermediate signal is outside of the range.

22 Claims, 1 Drawing Sheet

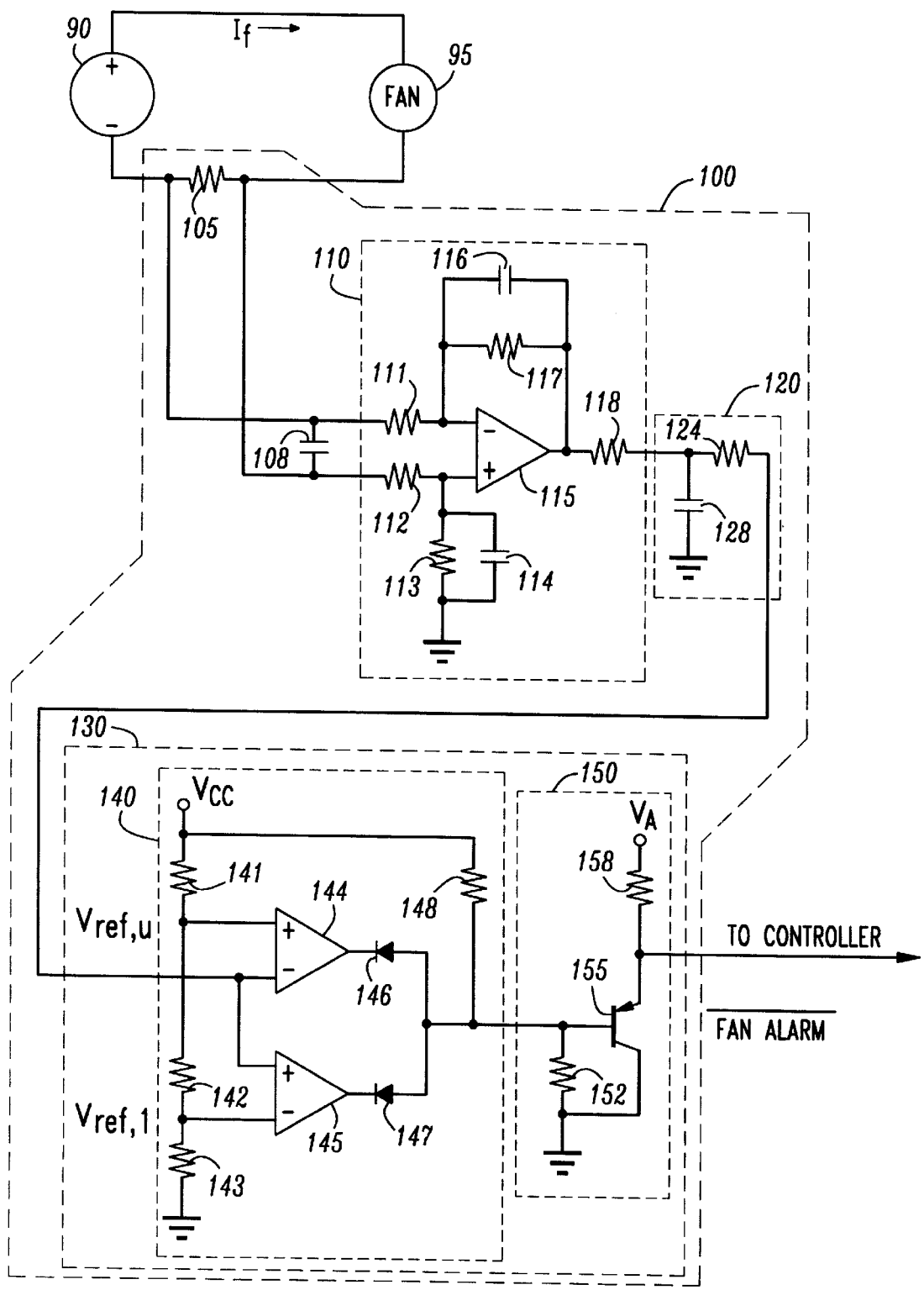

FAN OPERATION DETECTION CIRCUIT FOR A DC FAN AND METHOD OF OPERATION THEREOF

TECHNICAL FIELD OF THE INVENTION

The present invention is directed, in general, to DC cooling fans and, more specifically, to detection circuits that monitor the operation of brushless DC cooling fans.

BACKGROUND OF THE INVENTION

One or more brushless DC cooling fans are conventionally employed in power conversion systems to remove heat generated by semiconductor switching devices, magnetic energy storage components and filtering components, as well as other circuit components that are part of the power conversion equipment. The cooling fans advantageously allow the power conversion equipment to be operated in an extended temperature range. Cooling fans thus play an important role in overall system reliability and lifetime.

In most applications, high cost brushless fans having integral speed sensors (sometimes referred to as "tachometers") are usually employed to cool the electronic power conversion equipment. Typical speed sensors transmit a speed feedback signal in the form of a fixed duty cycle pulse train to a detection circuit via a third terminal on the fan. The detection circuit receives and interprets the pulse train, governing a fan alarm and system safety interlock as a function thereof. Whenever the detection circuit does not detect a speed feedback signal, the detection circuit trips the alarm and the system safety interlock to warn of a potentially harmful situation and power down the power conversion system to protect electronic components in the power conversion system from overheating.

Unfortunately, fans with integral speed sensors are more expensive and suffer reliability problems. They are costly to manufacture, test and trouble-shoot. Any problems with the speed sensor, fan connectors, wiring, cables or detection circuitry may cause the detection circuit to shut down the power conversion system, even when the fan itself is operating normally. To avoid the expense and unreliability of fans with integral speed sensors, fans without such sensors are being increasingly employed, thereby risking undetected fan failure.

It should be apparent that the risk of a spurious shutdown of a power conversion system employed in a critical application, such as telecommunications, is unacceptable. It should be equally apparent, however, that legitimate fan failure should be cause for taking protective measures. Accordingly, what is needed in the art is a method and circuit for detecting the operational state of a fan, without requiring an integral speed sensor.

SUMMARY OF THE INVENTION

To address the above-discussed deficiencies of the prior art, the present invention provides, for use with a DC fan, a detection circuit and a method of detecting an operational condition thereof. In one embodiment, the detection circuit includes: (1) a sensor, coupled to the DC fan, that senses a current through the sensorless DC fan and produces an intermediate signal based thereon and (2) an alarm circuit, coupled to the sensor, that compares the intermediate signal to a range defined by an upper limit signal and a lower limit signal and generates an alarm signal when the intermediate signal is outside of the range.

The present invention therefore introduces, among other things, the broad concept of determining the operational condition of a DC fan based upon the amount of current flowing through the DC fan motor. In one embodiment, a range is established. Current levels within the range indicate normal operation of the DC fan. Current Levels outside of the range indicate that, among other things, the DC fan may not be running or that its rotor may be locked.

In one embodiment of the present invention, the alarm circuit comprises a level comparison circuit and a signal generation circuit coupled thereto. The operation of these circuits will be set forth in detail in an embodiment to be illustrated.

In one embodiment of the present invention, the alarm circuit comprises a first comparator that compares the intermediate signal to the upper limit signal and a second comparator that compares the lower limit signal. Those skilled in the pertinent art will perceive, however, that the present invention may be embodied in digital hardware or computer firmware or software, obviating the need for comparators.

In one embodiment of the present invention, the alarm circuit comprises an alarm signal element. In the embodiment to be illustrated and described, the alarm signal element takes the form of a transistor. Those skilled in the art will perceive alternative components or circuits that can function advantageously in a detection circuit.

In one embodiment of the present invention, the sensor is a resistor. The sensor develops a voltage thereacross that is a function of current flow therethrough. Of course, other components may be employed to measure current flowing through the DC fan motor.

In one embodiment of the present invention, the upper limit signal and the lower limit signal are derived from resistor divider networks. In the embodiment to be illustrated and described, the upper limit signal defines an upper limit of about 15 VDC (commonly Vcc) and the lower limit signal defines a lower limit of about 0 VDC (commonly Vee).

In one embodiment of the present invention, the detection circuit further includes a differential amplifier circuit, interposed between the sensor and the alarm circuit, that amplifies the intermediate signal. Amplification is advantageous when the intermediate signal is initially weak. Of course, amplification is not necessary to the broad scope of the present invention.

In one embodiment of the present invention, the detection circuit further includes a filter, interposed between the sensor and the alarm circuit, that filters the intermediate signal. Of course, the filter is not necessary to the broad scope of the present invention.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following description taken in conjunction with the accompanying drawing, in which:

The FIGURE illustrates a schematic diagram of an embodiment of a detection circuit constructed according to the principles of the present invention.

DETAILED DESCRIPTION

Referring to the FIGURE, illustrated is a schematic diagram of an embodiment of a detection circuit 100 constructed according to the principles of the present invention. A DC power source 90 supplies power to a brushless, sensorless DC fan 95. (In the illustrated embodiment, the DC fan 95 is brushless, though one skilled in the pertinent art will understand that the present invention is not limited to brushless DC fans). The detection circuit 100 includes a sensor resistor 105 that is coupled to the DC fan 95 to sense current (fan current $I_f$) flowing through the DC fan 95. The sensor resistor 105 produces an intermediate signal of varying voltage that is proportionate to the fan current $I_f$. A sensor capacitor 108 is also coupled across the sensor resistor 105 to filter out pulsation ripple components.

A differential amplifier circuit 110, which includes common-mode noise rejections, is coupled to and receives the intermediate signal from the sensor resistor 105. The differential amplifier circuit 110 includes first and second amplifying resistors 111, 112 coupled to the sensor resistor 105 and to inverting and noninverting inputs of an operational amplifier (op-amp) 115, respectively. A parallel-coupled third amplifying resistor 113 and first amplifying capacitor 114 are coupled to a noninverting input of the op-amp 115. A parallel-coupled fourth amplifying 117 and second amplifying capacitor 116 are coupled between a inverting input and a output of the op-amp 115 to provide negative feedback. Finally, an output resistor 118 is coupled between the output of the op-amp 115 and a filter 120.

In an advantageous embodiment, the filter 120 is an RC filter comprising a filter resistor 124 and a filter capacitor 128. The filter is used to filter out noise contained in the amplified intermediate signal from the differential amplifier circuit 110. Those skilled in the art will recognize that types of filters may be employed for the filter 120.

The filter resistor 124 is coupled to an alarm circuit 130 that, in turn, comprises a level comparison circuit 140 and a signal generation circuit 150. The level comparison circuit 140 includes a resistor divider network made up of first, second and third divider resistors 141, 142, 143. The first and third divider resistors 141, 143 are coupled to a constant voltage Vcc and to ground, respectively. In an advantageous embodiment, the constant voltage Vcc is about 15 VDC and ground is about 0VDC.

First and second comparators 144, 145 receive a filtered signal from the filter into their inverting and noninverting inputs, respectively. The first comparator 144 compares the intermediate signal, which has been amplified and filtered, to an upper limit signal $V_{refu}$ that is derived from between the first and second divider resistors 141, 142. The second comparator 145 compares the same intermediate signal to a lower limit signal $V_{refl}$ that is derived from between the second and third divider resistors 142, 143. First and second diodes 146, 147 are coupled to the outputs of the first and second comparators 144, 145, respectively. The diodes 146, 147 are logically ORed such that either the first or the second diode 146, 147, when active, yields a signal. Additionally, a pull-up resistor 148 is coupled between the constant voltage Vcc and the common anode of the first and second diodes 146, 147.

The first and second diodes 146, 147 are coupled to a signal generation circuit 150 that includes an alarm signal element 155, a first generation resistor 152 and a second generation resistor 158. The second generation resistor 158 is further coupled to a constant alarm voltage Va. In an advantageous embodiment, the constant alarm voltage Va may have the same value as the constant voltage Vcc. In the illustrated embodiment, the alarm signal element 155 is a transistor. Finally, the alarm signal element 155 generates an alarm signal that is sent to a controller (not shown)

The operation of the detection circuit 100 will hereinafter be described. When the DC fan 95 is operating under normal conditions, the fan current $I_f$ flows through the DC fan 95 and, subsequently, through the sensor resistor 105. In response to that current $I_f$, the sensor resistor 105 produces an intermediate signal that is proportionate to the fan current $I_f$. Commonly, the sensor resistor 105 is chosen to have a relatively small value, such that it does not interfere with the fan circuit by draining an appreciable amount of power. Consequently, the intermediate signal produced is relatively small. The differential amplifier circuit 110 functions to amplify the intermediate signal to a workable level while suppressing common-mode noise. Once amplified, the intermediate signal is passed through the filter 120 to remove excess noise.

Once amplified and filtered, the intermediate signal is compared to the preselected levels in the level comparison circuit 140. The first comparator 144 compares the intermediate signal to an upper limit signal that is derived from a node (not separately referenced) between the first and second divider resistors 141, 142. Concurrently, the second comparator 145 compares the intermediate signal to a lower limit signal that is derived from a node (not separately referenced) between the second and third divider resistors 142, 143.

When the DC fan 95 is operating normally (e.g., within specified speed ranges), the intermediate signal remains within the upper and lower limits set by the upper and lower limit signals, respectively. In such cases, the outputs of both comparators remain high, preventing both of the diodes 146, 147 from conducting.

If the intermediate signal rises above the level of the upper limit signal, commonly due to a stalled fan, the output of the first comparator 144 goes low, allowing the first diode 146 to conduct. In a similar fashion, if the intermediate signal drops below the level of the lower limit signal, the output of the second comparator 145 goes low, allowing the second diode 147 to conduct. When either the first or second diode 146, 147 begins to conduct, the output of the alarm signal element 155 is turned on, thus pulling the output of the signal generation circuit 150 to a logic low level to direct an alarm signal to the controller (not shown).

DC fans of the type described above commonly have three operating conditions: (1) normal operation, (2) no operation ($I_f$<lower limit) or (3) aberrant operation (fan current $I_f$>upper limit and fan stalled or fan short circuit). The illustrated embodiment of the present invention handles these three operating conditions thus: in normal operation, the intermediate signal remains within the range set by the upper limit signal and the lower limit signal. When the fan is not running or the fan current $I_f$ is below the lower limit signal, the detection circuit 100 generates an alarm signal to cause downstream equipment to be shut down.

If the fan stalls, the fan current $I_f$ pulses between a level above the upper limit signal and then below the lower limit signal. Consequently, when the fan current $I_f$ pulses, or when the fan is short-circuited ($I_f$>upper limit signal), the detection circuit generates an alarm signal so that the equipment being cooled by the fan may be shut down to avoid damage.

While a specific embodiment of a detection circuit and a method of monitoring a sensorless DC fan have been illustrated and described, other embodiments are well within the broad scope of the present invention. For a better understanding of fan operation detection circuits in general, see "Principles of Power Electronics" by John G. Kassakian, et al., Addison Wesley, Inc. (1991), which is incorporated herein by reference.

From the above, it is apparent that the present invention provides, for use with a DC fan, a detection circuit and a method of detecting an operational condition thereof. In one embodiment, the detection circuit includes: (1) a sensor, coupled to the DC fan, that senses a current through the sensorless DC fan and produces an intermediate signal based thereon and (2) an alarm circuit, coupled to the sensor, that compares the intermediate signal to a range defined by an upper limit signal and a lower limit signal and generates an alarm signal when the intermediate signal is outside of the range.

Although the present invention has been described in detail, those skilled in the art should understand that they can make various changes, substitutions and alterations herein without departing from the spirit and scope of the invention in its broadest form.

What is claimed is:

1. For use with a sensorless DC fan, a detection circuit comprising:

a sensor, coupled to said DC fan, that senses an operational current through said DC fan and produces an intermediate signal based thereon; and an alarm circuit, coupled to said sensor, that compares said intermediate signal to a range defined by an upper limit signal and a lower limit signal and generates an alarm signal when said intermediate signal is outside of said range.

2. The detection circuit as recited in claim 1 wherein said alarm circuit comprises a level comparison circuit and a signal generation circuit coupled thereto.

3. The detection circuit as recited in claim 1 wherein said alarm circuit comprises a first comparator that compares said intermediate signal to said upper limit signal and a second comparator that compares said lower limit signal.

4. The detection circuit as recited in claim 1 wherein said alarm circuit comprises an alarm signal element.

5. The detection circuit as recited in claim 1 wherein said sensor comprises a resistor.

6. The detection circuit as recited in claim 1 wherein said upper limit signal and said lower limit signal are derived from resistor divider networks.

7. The detection circuit as recited in claim 1 wherein said upper limit signal defines an upper limit of about 15 VDC.

8. The detection circuit as recited in claim 1 wherein said lower limit signal defines a lower limit of about 0 VDC.

9. The detection circuit as recited in claim 1 further comprising a differential amplifier circuit, interposed between said sensor and said alarm circuit, that amplifies said intermediate signal.

10. The detection circuit as recited in claim 1 further comprising a filter, interposed between said sensor and said alarm circuit, that filters said intermediate signal.

11. The detection circuit as recited in claim 1 wherein said DC fan has variable operational states.

12. A method of detecting an operational condition of a sensorless DC fan, comprising:

sensing an operational current through said sensorless DC fan;

producing an intermediate signal based on said current;

comparing said intermediate signal to a range defined by an upper limit signal and a lower limit signal; and generating an alarm signal when said intermediate signal is outside of said range.

13. The method as recited in claim 12 wherein said comparing and generating are carried out with a level comparison circuit and a signal generation circuit coupled thereto.

14. The method as recited in claim 12 wherein said comparing is carried out with a first comparator that compares said intermediate signal to said upper limit signal and a second comparator that compares said lower limit signal.

15. The method as recited in claim 12 wherein said generating is carried out with an alarm signal element.

16. The method as recited in claim 12 wherein said sensing comprises sensing said current with a resistor.

17. The method as recited in claim 12 further comprising deriving said upper limit signal and said lower limit signal from resistor divider networks.

18. The method as recited in claim 12 further comprising defining an upper limit with said upper limit signal at about 15 VDC.

19. The method as recited in claim 12 further comprising defining a lower limit with said lower limit signal at about 0 VDC.

20. The method as recited in claim 12 further comprising amplifying said intermediate signal.

21. The method as recited in claim 12 further comprising filtering said intermediate signal.

22. The method as recited in claim 12 wherein said DC fan has variable operational states.

* * * * *